Oct. 24, 1967  D. ROBERTS  3,348,989
PROCESS FOR MANUFACTURING IMPREGNATED CELLULAR MATERIALS
Filed July 22, 1963
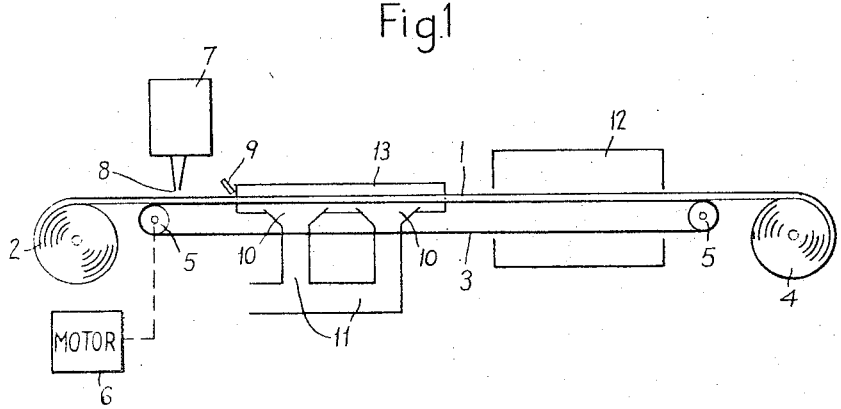
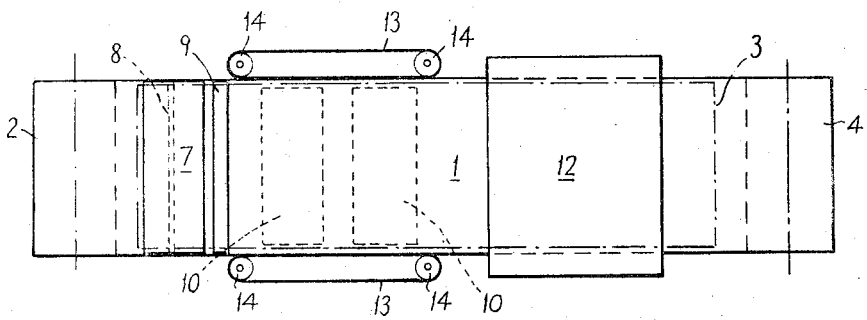
Inventor
DOUGLAS ROBERTS
By
Holcombe, Wetherill + Brisebois
Attorneys

United States Patent Office 3,348,989
Patented Oct. 24, 1967

3,348,989
PROCESS FOR MANUFACTURING IMPREGNATED CELLULAR MATERIALS
Douglas Roberts, Stoulton, Worcester, England, assignor to Witco Chemical Company Limited, London, England, a British company
Filed July 22, 1963, Ser. No. 296,648
Claims priority, application Great Britain, Aug. 16, 1962, 31,487/62
13 Claims. (Cl. 156—285)

Patent No. 3,042,573 discloses a process and apparatus for manufacturing impregnated woven or non-woven fibrous sheet materials wherein an impregnant in the form of a foam is applied on to one surface of a fibrous sheet material and suction is applied to the opposite surface of the fibrous sheet material to suck the impregnant into said fibrous sheet material. This process, as described, may be operated either as a static process or as a so-called continuous process. In the latter case a strip or web of fibrous sheet material is fed past a position in which one surface thereof is coated with the foamed impregnant to a further position at which suction is applied to the opposite surface of the fibrous sheet material to suck the impregnant into the material.

It has now been discovered that the method and apparatus disclosed in our aforementioned patent may be employed for the treatment of cellular materials having an intercommunicating cell structure. In particular the method and apparatus may be employed for the treatment of resilient sponge or foam cellular material having intercommunicating cells in order to vary characteristics and properties of such materials.

According to the present invention, therefore, there is provided a method of impregnating a cellular material having an intercommunicating cell structure wherein a substance to be introduced into the cellular material is applied in the form of a foam on to one surface of the cellular material and suction is applied to the opposite surface of the cellular material in order to draw the substance into said cellular material.

The present invention may particularly be employed for the post treatment of polyurethane foam material after such material has been manufactured and set, in order to improve certain of the properties and qualities of the material, for example its resilience.

It has already been proposed to treat resilient sponge or foam cellular materials having intercommunicating cells, such as foam rubbers and polyurethane foam materials, with a natural or synthetic rubber which is applied to the material in the form of an aqueous dispersion or latex, in order to vary certain characteristics and in particular the resiliency and compression resistance characteristics of the material. In such prior proposals the sponge or foam cellular material is thoroughly soaked or wetted with the aqueous dispersion or latex, for example by dipping or spraying, whereafter the article is squeezed, for example between rollers, or centrifuged to remove excess liquid and then dried. The aqueous dispersion or latex used may be of the vulcanized or unvulcanized type and where the latter is employed a subsequent vulcanization is carried out. By means of this process a coating of rubber is formed on the internal cell walls of the material.

However, in carrying out such a process according to these prior proposals, it is only possible to employ a solid content of between approximately 15% and 30% in the aqueous dispersion or latex in order to ensure that a sufficiently low viscosity is achieved for the aqueous dispersion or latex to penetrate into the cellular material and that an even deposition of the aqueous dispersion or latex throughout the foam results. Due to the low total solids content of the aqueous dispersion or latex, a large surplus of the entrained low solids latex is expelled when the material is squeezed to remove the excess liquid. Moreover a prolonged drying of the material is necessary in order to remove the large volume of water present in the aqueous dispersion or latex remaining in the cellular material. These factors make it difficult to achieve rapid gellation of the latex deposited on the cell walls in the cellular material, due to the high chemical and physical stability normally associated with dilute latex saturants. It is however important in some applications that the latex deposited on the cell walls of the sponge or foam cellular material undergoes a rapid reversal of the rubber liquid phase in order to obtain the maximum effects from the rubber.

A further disadvantage of such a process which is present when the sponge or foam celluar material is immersed in an aqueous dispersion or latex, is that the high stability tendency of the entrained latex in the bath may lead to a stratification of the liquid latex phase primarily due to a normal drainage effect.

According to the process of the present invention, however, characteristics of a sponge or foam cellular material and particularly a polyurethane foam material are modified by applying a foamed aqueous dispersion or latex on to one surface of the material and applying suction to the opposite surface of the material so as to draw the foamed aqueous dispersion or latex into the material and so that it adheres to the walls of the cells of the material.

By employing the process according to the present invention, the aqueous dispersion or latex can contain between approximately 45% and 60% solids, thus reducing the amount of water which ultimately has to be removed. The movement of the impregnating material with the high solid content is controlled externally by means of the applied suction. Moreover the action of introducing air into the aqueous dispersion or latex to produce a foam imparts a buoyancy to the impregnating material which further reduces the possibility of normal drainage after it has been sucked into the sponge or foam cellular material to be treated. In addition it is easier to effect more rapid gellation of the aqueous dispersion or latex by using sensitizers, such as polyvinyl methyl ether, or silico fluorides, for example. These may be included in the aqueous dispersion or latex just prior to its application to the cellular material or alternatively they can be introduced into the cellular material prior to the introduction of the foamed impregnant so that they react therewith when the foamed impregnant is introduced. Furthermore it is possible to effect impregnation only partially through the thickness of the cellular material.

If desired a layer of another porous material, such as a woven material, may be bonded to the cellular material during the impregnation process by placing this porous material on top of the cellular material, applying the foam on to the surface of the porous material and drawing it through the latter into the cellular material.

Cellular material may also be bonded on to the back of carpets or the like by the process according to the present invention by sucking the impregnant through the cellular material into the back of the carpet. In this way a carpeting combined with a resilient sponge or foam underlay or cushion can be produced.

Some examples of carrying out the process according to the invention will now be given.

EXAMPLE 1

A natural latex compound consisting of natural latex stabilized with a caustic casein stabilizer containing 10% filler content was foamed to eight times its original volume and applied over the upper surface of a piece of manufactured polyether foam material having a thickness of approximately ½ inch. Suction was then applied to the opposite surface so as to pull the latex completely through the polyether foam material. The resulting material was then placed in an oven and dried for 10 minutes at 120° C.

EXAMPLE 2

A sheet of manufactured polyether foam material having a thickness of approximately ¼ inch was taken and hessian scrim was placed over its upper surface. A natural latex was foamed to five times its original volume and spread in a layer over the top of the scrim. Suction was then applied to the other surface of the polyether foam material to draw the latex into the cells of the foam material. The product was then dried for ten minutes at 120° C. and under slight pressure to maintain contact between the hessian and the polyether foam material. In the final product the latex not only served to impregnate the polyether foam material but also to bond the scrim to the material.

EXAMPLE 3

A sheet of manufactured polyether foam material having a thickness of approximately ¾ inch had applied to its upper surface a layer of an impregnant consisting of a styrene butadiene rubber latex stabilized with a small proportion of sodium lauryl ether sulphate and containing 50% filler, foamed to three times its original volume. Suction was then applied to the opposite surface of the material to pull the synthetic latex a third of the way through the thickness of the material and the product was then dried for seven minutes at 120° C.

EXAMPLE 4

A 3-inch thick cushion of manufactured polyether foam material was taken and a natural latex foamed to twelve times its original volume was spread over the upper surface of the material. Suction was then applied to pull the latex one third of the way through the thickness of the material. The resulting product was then dried for 20 minutes at 130° C., and the whole process repeated on the other face of the cushion.

EXAMPLE 5

A length of 2-inch thick manufactured polyether foam material had spread over its upper surface a natural latex compound consisting of a natural latex stabilized with a nonyl phenyl ethylene oxide condensate, having a filler content of 20%, and foamed to sixteen times its original volume. Suction was then applied to the opposite surface of the material and the foam was sucked through to this opposite surface. The product was then dried in a forced air drying oven for 25 minutes at 130° C.

EXAMPLE 6

A synthetic latex compound consisting of a styrene butadiene rubber latex of 25% styrene content which had been stabilized with a sodium lauryl ether sulphate and having a filler content consisting of 10% china clay and 10% rubber crumb dustings, was foamed to ten times its original volume and applied over the upper surface of a 3-inch thick section of manufactured polyether foam material. Suction was applied to the opposite surface of the material so that the latex was sucked into it leaving a layer of rubber crumb on the upper surface of the foam to produce a non-skid backing. The product was then dried for ten minutes at 120° C.

In order to carry out the process according to the present invention the apparatus employed may be generally similar to that disclosed in Patent No. 3,042,573. However it may be desirable to arrange for additional suction to be applied to the material particularly where thick materials are being treated. Furthermore means may be provided on the apparatus so as to seal the edges of the cellular material during the time that suction is being applied to it in order to reduce or avoid a loss of suction. Where the process is being carried out as a continuous process on a strip or web of cellular material, such as polyurethane foam material, which moves on a perforated conveyor over the suction devices, the desired result can be achieved by providing sealing strips of a flexible material which engage with the side edges of the material whilst suction is being applied to the material to draw the foamed impregnating substance into the material. If desired these sealing strips may be adjustable so as to be suitable for use with different widths and thicknesses of cellular material to be treated. In one arrangement the sealing strips may each be mounted on or comprise an endless belt and are arranged one on either side of the perforated conveyor.

An embodiment of the apparatus for carrying out the process according to the present invention will now be described with reference to the accompanying drawings, in which:

FIGURE 1 is a side view of a diagrammatic representation of the apparatus, and

FIGURE 2 is a plan view of the apparatus shown in FIGURE 1.

Referring to the drawings, a length of manufactured cellular material 1, such as a polyether foam, is fed from a supply roll 2, over an endless conveyor 3 to a take-up roll 4. The endless conveyor, which is perforated or foraminous, passes around rollers 5, and is driven in rotation by means of a motor 6. The impregnant, for example a natural or synthetic latex compound as described in the foregoing examples, is foamed and is fed from the container 7 through the slot or nozzle 8 extending across the width of the apparatus, on to the upper surface of the material 1. A doctor blade 9 is provided to spread an even layer of foamed impregnant over the surface of the material. The material then travels past suction apertures 10 which are arranged beneath the upper portion of the perforated conveyor 3, the suction being applied to these apertures through the pipes 11. The suction serves to draw the foamed impregnant into the material which then travels through a drying oven 12 wherein the material is dried before it is fed on to the roll 4. In order to avoid or reduce the loss of suction through the side edges of the cellular material during the introduction of the impregnant into the material, sealing strips 13 are provided which engage with the two opposite side edges of the material 1 over the region where suction is applied to it. These sealing strips which are of a flexible material may be stationary or may comprise endless belts, as shown, which pass over rollers 14. The rollers may be driven from the motor 6 so that the sealing strips 13 travel with the conveyor 3. The sealing strips may be adjustable so as to be suitable for use with different widths and thicknesses of cellular material to be treated.

The degree of penetration of the impregnant into the cellular material can be adjusted by varying the amount of suction applied through the apertures 10 and also by varying the speed of travel of the conveyor 3 and hence of the material over the suction apertures.

The nature of the final product obtained and the operating conditions for achieving the desired result will also depend to some extent upon the foam structure of the aqueous dispersion or latex applied on to the cellular material. For certain treatments it may be desirable to formulate the aqueous dispersion or latex so that when it is foamed, the foam is comparatively unstable and of low viscosity so as to permit a rapid wetting by the impregnating substance right through the thickness of the cellular material. Alternatively, in cases where it is desired that the impregnating substance shall only be introduced partially through the thickness of the cellular material the aqueous dispersion or latex should be formulated so as to produce a highly stable foam structure with a high viscosity.

The process according to the present invention may be employed for treating cellular materials up to a considerable thickness; for example polyurethane foams over a thickness range of from 1/8" up to approximately 3" have been successfully treated by the process according to the present invention with an aqueous dispersion or latex in order to increase their resilience and vary their compression resistance characteristics. The process is also suitable for treating cellular materials of an even greater thickness.

Although the invention has been particularly described as applied to the treatment of polyurethane foam materials it may also find uses in the treatment of any other cellular material having an intercommunicating cellular structure such as natural or synthetic foam rubber materials, or rigid cellular materials such as polystyrene foam in order to vary their properties and characteristics of these materials. The invention may obviously also be employed for treating cellular materials with other impregnating substances besides aqueous dispersions or latex.

Instead of applying the foamed impregnant directly on to the upper surface of the cellular material it may be applied on to a perforated support or sheet positioned in contact with or close to the upper surface of the material as described in my Patent No. 3,084,661.

It will also be understood that the process can be carried out as a static process, particularly on relatively small pieces of cellular material, by applying the suction to the material at the same position as that at which the foamed impregnant is applied on to its upper surface. In such a case the sealing means may take the form of a band of flexible material extending around the edges of the piece of material.

I claim:

1. A process for impregnating a cellular material having an intercommunicating cell structure, wherein a substance to be introduced into the cellular material is applied in the form of a fluid foam on to one surface of the cellular material and suction is applied to the opposite surface of the cellular material in order to draw the substance into the cellular material.

2. A process as claimed in claim 1, in which the cellular material is a polyurethane foam material.

3. A process as claimed in claim 2, in which the cellular material is a polyether foam material.

4. A process as claimed in claim 1, wherein the substance is applied on to the surface of a porous material in contact with the surface of the cellular material to be impregnated and serves to bond a porous material to the cellular material.

5. A process as claimed in claim 1, wherein the cellular material is bonded on to the back of a carpet by sucking said substance through the cellular material.

6. A process for modifying the characteristics of a cellular material having an intercommunicating cell structure by applying a foamed aqueous dispersion of a coating material on to one surface of the cellular material and applying suction to the opposite surface of the cellular material so as to draw the foamed aqueous dispersion into the cellular material so that it adheres to the walls of the cells of the cellular material.

7. A process according to claim 6, wherein the aqueous dispersion contains between approximately 45% to 60% solid content.

8. A process as claimed in claim 6, in which a sensitizer is used to effect more rapid gellation of the aqueous dispersion.

9. A process as claimed in claim 8, in which the sensitizer is included in the aqueous dispersion just prior to its application to the cellular material.

10. A process as claimed in claim 8, in which the sensitizer is introduced into the cellular material prior to the introduction of the aqueous dispersion.

11. A process as claimed in claim 6, in which the foamed aqueous dispersion is a latex.

12. The process as claimed in claim 6 in which said cellular material is polyurethane foam material.

13. A process as claimed in claim 12, in which the material is a polyether foam material.

References Cited

UNITED STATES PATENTS

| | | | |
|---|---|---|---|
| 2,843,568 | 7/1958 | Benning et al. | 260—77.5 |
| 2,927,876 | 3/1960 | Joppe et al. | 161—119 |
| 2,950,221 | 8/1960 | Bauer et al. | 161—124 X |
| 2,955,056 | 10/1960 | Knox | 117—98 |
| 3,042,573 | 7/1962 | Roberts | 156—285 |
| 3,043,738 | 7/1962 | Demeter et al. | 156—285 X |
| 3,054,713 | 9/1962 | Walter | 156—198 |
| 3,084,661 | 4/1963 | Roberts | 117—38 X |
| 3,193,406 | 7/1965 | Mittelman | 117—120 |
| 3,193,441 | 7/1965 | Schafer | 161—159 |

FOREIGN PATENTS 253,784   6/1926   Great Britain.

EARL M. BERGERT, *Primary Examiner.*

H. F. EPSTEIN, *Assistant Examiner.*